Aug. 9, 1938.   S. T. BASIL   2,125,980
DENTAL INSTRUMENT
Filed Feb. 23, 1937

INVENTOR.
STEPHEN THEODORE BASIL
BY
ATTORNEYS

Patented Aug. 9, 1938

2,125,980

UNITED STATES PATENT OFFICE 2,125,980

DENTAL INSTRUMENT

Stephen Theodore Basil, New York, N. Y.

Application February 23, 1937, Serial No. 127,066

2 Claims. (Cl. 32—69)

This invention relates to dental instruments, and refers more particularly to an implement, tool or appliance adapted to be used by dentists and dental surgeons in the course of their work on the mouth of a patient.

An object of the present invention is the provision of a dental instrument through the use of which the danger of injury to the patient in the course of various dental operations may be effectively avoided.

Another object is the provision of an instrument which will facilitate dental work on the mouth of a patient, and which at the same time will protect the patient from accidental injury.

A further object is the provision of a dental tool, which will clearly indicate to a dentist or dental surgeon the section of the patient's mouth to be treated and which at the same time will provide freedom of movement for work on that section.

In the course of various dental operations, such as the grinding of teeth and the insertion of separating disks, the field of vision of the operator is comparatively small, and the section to be treated is further limited by portions of the patient's tongue and cheek which overlap this section. Accurate work is therefore comparatively difficult so that the cheek or tongue of the patient is likely to be injured in the course of said work.

I have found that these drawbacks may be overcome through the provision of a dental instrument which combines a mirror used for the purpose of improving the field of vision of the dentist with a cheek-retracting element which insures further safety to the patient and at the same time increases the space within which the dentist can operate. When the lower teeth are to be treated, the instrument should preferably comprise a tongue-depressing element which will diminish danger of injury to the tongue and at the same time increase the space available for dental work.

Other objects of the present invention will appear more clearly from the following description when taken in connection with the accompanying drawing showing, by way of example, preferred embodiments of the inventive idea.

Figure 1:
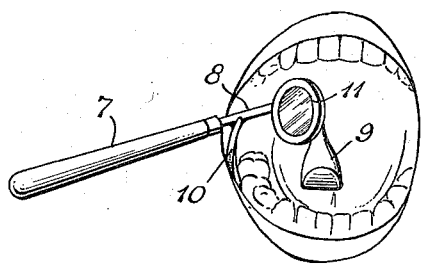
Figure 1 shows in operation a dental instrument constructed in accordance with the principles of the present invention.

The instrument shown in Figures 1 to 4 of the drawing is intended for use on the right-hand teeth of the lower jaw and comprises a handle 7 carrying a stem or rod 8. The rod 8 carries three elements, namely, the tongue-depressing member 9, the cheek-retracting member 10, and the mirror 11.

The tongue-depressing member 9 is firmly connected with the free end of the rod 8, and/or is made of the same piece of material as the rod 8. The cheek-retracting member 10 is situated adjacent the handle 7, while the mirror 11 is located between the cheek-retracting member 10 and the tongue-depressing member 9.

Figure 2:
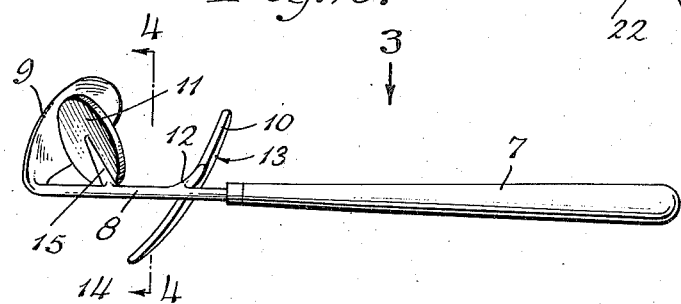
Figure 2 shows the same instrument in side elevation.
Figure 3:
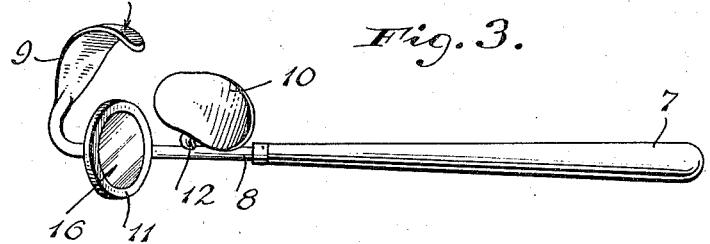
Figure 3 is a view of the same instrument in the direction of the arrow 3 in Fig. 2.
Figure 4:
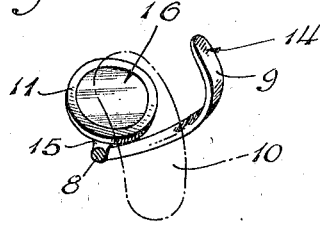
Figure 4 is a section along the line 4—4 of Fig. 2.

As shown more clearly in Figs. 2 and 3, the cheek-retracting member 10 is provided with a stem 12 which connects it to the rod 8, and has the form of a somewhat curved and substantially rounded plate or leaf. The rear surfaces 13 of the cheek-retracting member 10 are adapted to engage the inner surfaces of the cheek and to press the cheek outwardly, thereby increasing the space available for operation and avoiding the danger of injury to the cheek of the patient.

As shown in Fig. 1, the instrument is inserted into the patient's mouth in such manner that his teeth are situated between the cheek-retracting member 10 and the tongue-depressing member 9. The member 9 has the form of a thin and wide curved hook, the outer surface 14 of which is adapted to press downwardly upon the patient's tongue.

The mirror 11, which is situated between the members 9 and 10, is firmly connected by a stem 15 with the rod 8 and comprises a light-reflecting surface 16, which is clearly visible to the dentist in the course of his work.

As illustrated in Figure 1, the described instrument will move the cheek and the tongue of the patient away from the teeth to be treated, thereby insuring additional safety to the patient and greater convenience to the operator. At the same time, the teeth upon which the dentist is operating will be clearly visible to him through the mirror 11.

The described instrument is adapted for use in dental work on the teeth situated at the right-hand side of the lower jaw. A substantially similar instrument may be used for work on the teeth situated on the left-hand side of the lower jaw. However, such instrument would be the reflected or reverse image of the one illustrated.

Figure 5:
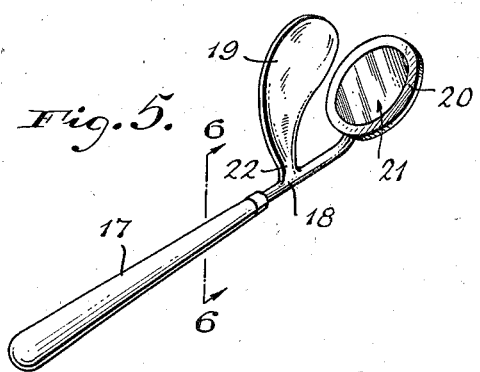
Figure 5 shows an instrument adapted for use on the upper right-hand teeth of the patient.
Figure 6:
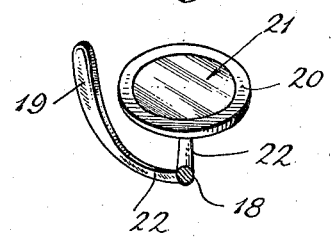
Figure 6 is a section along the line 6—6 of Fig. 5.

The instrument shown in Figures 5 and 6 of the drawing is adapted for use on the teeth situated on the upper right-hand side of the patient's mouth. This instrument comprises a handle 17, carrying a rod 18, which serves as a support or carrier for the cheek-retracting member 19 and the mirror 20. The member 19 has the form of a curved, rounded plate which resembles a leaf and which is connected by a stem 22 with the rod 18. The mirror 20 comprises a light-reflecting surface 21 and is connected with the rod 18 by means of a stem 22.

In operation, the instrument 17 is inserted into the patient's mouth and is so placed that the mirror 20 shows the teeth to be treated while at the same time the member 19 retracts that portion of the cheek which extends adjacent these teeth.

Preferably, the member 19 should not be light-reflecting, in order to avoid interference with the mirror 20.

Obviously, a similar device may be used for work on the left-hand teeth of the upper jaw by providing the cheek-retracting member on the opposite side of the rod.

As many changes can be made in the described constructions without departing from the scope of the present invention as defined by the appended claims, it is intended that all matter contained in the above description and shown in the accompanying drawing should be interpreted as illustrative and not in a limiting sense.

What is claimed is:

1. A dental instrument, comprising a rod, a mirror adapted to reflect the teeth to be treated, a separate cheek-retracting member carried by said rod and adapted to engage the inner surface of the patient's cheek adjacent the teeth to be treated and to press said surface away from said teeth while said teeth are being reflected in said mirror, and a separate tongue-depressing member carried by said rod and adapted to press the patient's tongue away from said teeth while said teeth are being reflected in said mirror, which is situated substantially between said tongue-depressing member and said cheek-retracting member.

2. A dental instrument, comprising a rod, a handle connected with one end of said rod, a mirror, a stem connecting said mirror with said rod, a separate cheek-retracting member situated between said mirror and said handle, a stem connecting said cheek-retracting member with said rod, said cheek-retracting member having the form of a curved, leaf-like element adapted to engage the inner surface of the patient's cheek adjacent the teeth to be treated and to press said surface away from said teeth while said teeth are being reflected in said mirror, and a separate tongue-depressing member connected with the opposite end of said rod and having the form of a hook-shaped, substantially thin and wide element adapted to engage the tongue of the patient and to depress said tongue while the teeth to be treated are reflected in said mirror, which is situated substantially between said tongue-depressing member and said cheek-retracting member.

STEPHEN THEODORE BASIL.